(12) United States Patent
Nakakusu

(10) Patent No.: US 10,026,207 B2
(45) Date of Patent: Jul. 17, 2018

(54) IMAGE DISPLAY DEVICE, IMAGE DISPLAY METHOD AND STORAGE MEDIUM

(71) Applicant: CASIO COMPUTER CO., LTD., Shibuya-ku (JP)

(72) Inventor: Toru Nakakusu, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/251,869

(22) Filed: Aug. 30, 2016

(65) Prior Publication Data

US 2017/0076477 A1 Mar. 16, 2017

(30) Foreign Application Priority Data

Sep. 15, 2015 (JP) .................................. 2015-181536

(51) Int. Cl.
*G06T 3/00* (2006.01)
*G06T 11/60* (2006.01)

(52) U.S. Cl.
CPC ............ *G06T 11/60* (2013.01); *G06T 3/0062* (2013.01)

(58) Field of Classification Search
CPC .......... G06T 11/60; G06T 3/40; G06T 3/0062
See application file for complete search history.

(56) References Cited

U.S. PATENT DOCUMENTS

| 8,675,041 | B2* | 3/2014 | Kuboyama | B60R 1/00 348/148 |
| 8,773,466 | B2* | 7/2014 | Matsuda | G06F 3/011 345/633 |
| 9,251,559 | B2* | 2/2016 | Kuwada | H04N 7/183 |
| 2012/0106866 | A1* | 5/2012 | Minakawa | G06T 3/0018 382/274 |
| 2013/0033448 | A1* | 2/2013 | Yano | G06F 3/04883 345/173 |
| 2013/0314444 | A1* | 11/2013 | Iwamoto | G06T 5/001 345/647 |

FOREIGN PATENT DOCUMENTS

JP 3066594 12/1999

* cited by examiner

*Primary Examiner* — Phi Hoang
(74) *Attorney, Agent, or Firm* — Cozen O'Connor

(57) ABSTRACT

An image display device including a display unit and a computing device that is operable to function as units including a clipping unit which clips an image of one portion from a fisheye image captured by using a fisheye lens as a clipping target area, a correcting unit which corrects distortion of the image clipped by the clipping unit, a specifying unit which specifies a vertical direction of a corrected image acquired by the correcting unit, based on orientation information when the fisheye image is captured, and a display control unit which controls the corrected image to be displayed on the display unit based on the vertical direction specified by the specifying unit.

14 Claims, 13 Drawing Sheets

SEPARATE-TYPE DIGITAL CAMERA

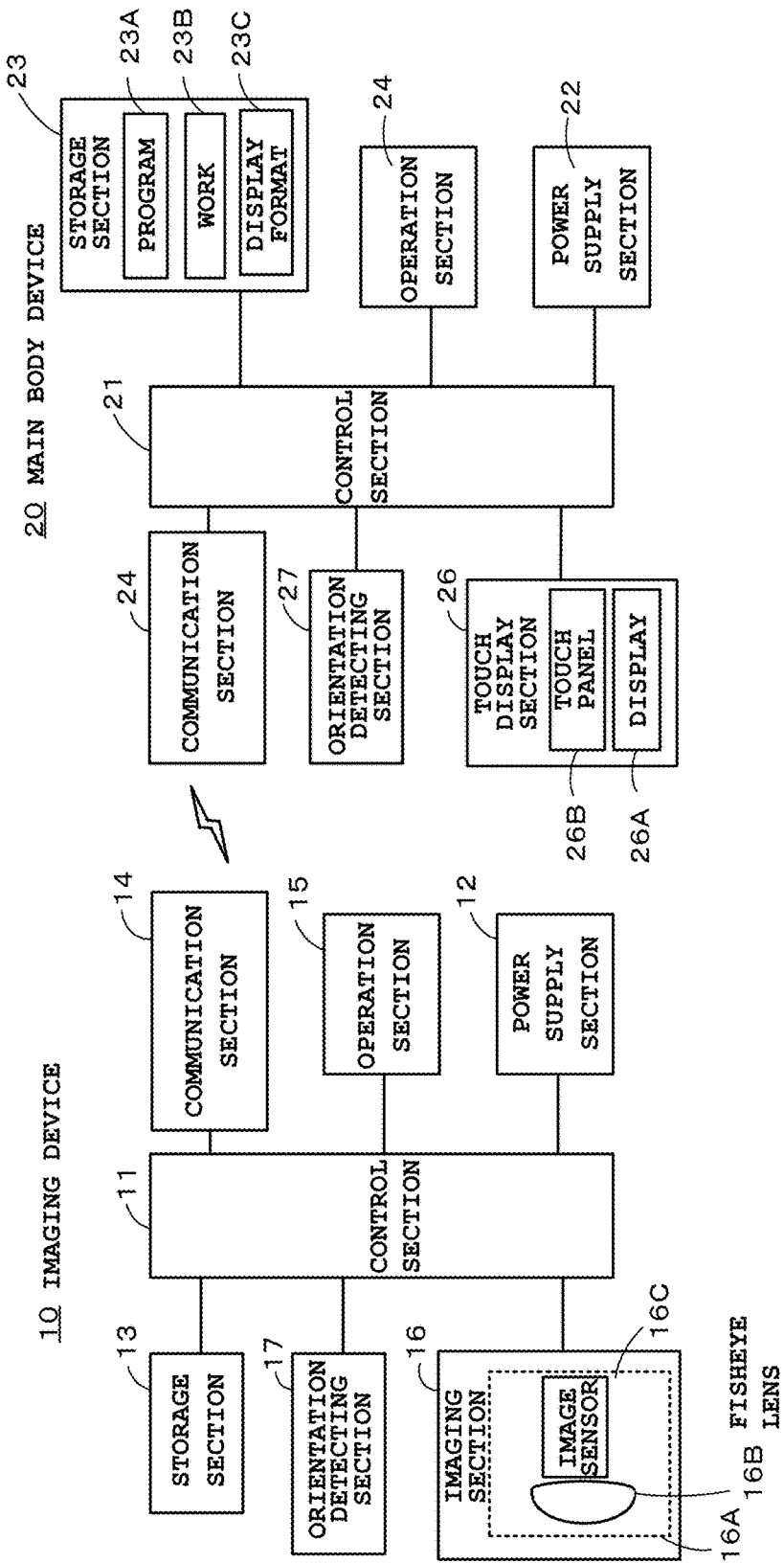

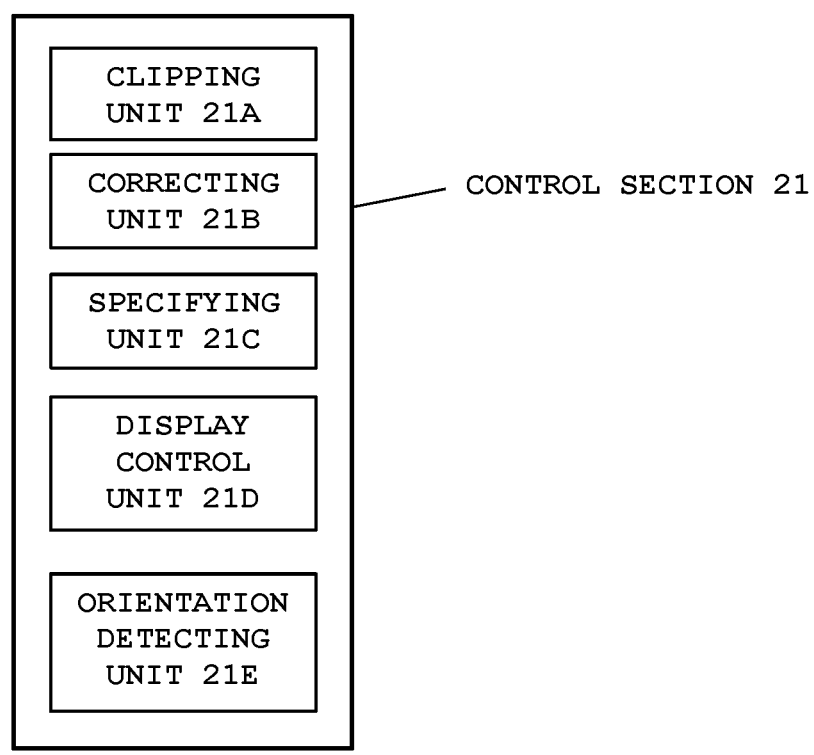

HORIZONTAL PHOTOGRAPHING
(HORIZONTAL PLACEMENT)

VERTICAL PHOTOGRAPHING
(VERTICAL PLACEMENT)

ORIENTATION OF IMAGING DEVICE IN VERTICAL PHOTOGRAPHING

FISHEYE IMAGE IN HORIZONTAL
PHOTOGRAPHING
(WHEN BUILDING GROUP IS IMAGED)

SPECIFIED BY TOUCHING DESIRED
POSITION ON FISHEYE IMAGE

CORRECTED IMAGE AFTER
DISTORTION CORRECTION IS
PERFORMED ON CLIPPED IMAGE

SPECIFY CLIPPING TARGET AREA IN
ACCORDANCE WITH TOUCHED POINT

CLIPPING TARGET
AREA SPECIFYING
METHOD

FIG. 11

*23C DISPLAY FORMAT TABLE*

| DISPLAY FORMAT | DETAILS | SELECTION FLAG |
|---|---|---|
| A | SWITCH BETWEEN FISHEYE IMAGE WITH MARK ON TOUCHED POINT AND CORRECTED IMAGE FOR DISPLAY | 0 |
| B | SUPERIMPOSE AND DISPLAY REDUCED FISHEYE IMAGE WITH MARK ON TOUCHED POINT AT CORNER IN CORRECTED IMAGE | 1 |
| C | DISPLAY CORRECTED IMAGE IN SUPERIMPOSED AND ENLARGED STATE ON TOUCHED POINT IN FISHEYE IMAGE | 0 |

CORRECTED IMAGE   GROUND MARK   REPORT FORMAT A (SWITCH DISPLAY)   FISHEYE IMAGE

CORRECTED IMAGE
POSITION MARK
FISHEYE IMAGE
GROUND MARK
REPORT FORMAT B (SIMULTANEOUS DISPLAY)

GROUND MARK   CORRECTED IMAGE   FISHEYE IMAGE

REPORT FORMAT C (SIMULTANEOUS DISPLAY)

IMAGE DISPLAY DEVICE, IMAGE DISPLAY METHOD AND STORAGE MEDIUM

CROSS-REFERENCE TO RELATED APPLICATION

This application is based upon and claims the benefit of priority from the prior Japanese Patent Application No. 2015-181536, filed Sep. 15, 2015, the entire contents of which are incorporated herein by reference.

BACKGROUND OF THE INVENTION

1. Field of the Invention

The present invention relates to an image display device, an image display method and a storage medium by which the distortion of a fisheye image captured by using a fisheye lens is corrected and the corrected image is displayed.

2. Description of the Related Art

A fisheye lens adopted in an imaging device such as a digital still camera can capture an image in a wide range with a viewing angle of, for example, substantially 180 degrees. However, a projective method has been adopted therein, and therefore an image captured by the fisheye lens (fisheye image) has a characteristic of being significantly distorted as being away from its center toward its edges (peripheral portion). As a technique of displaying a fisheye image captured by using this fisheye lens, an image processing device has been exemplarily disclosed in Japanese Utility Model Registration No. 3066594 in which an image in a predetermined area is clipped from a fisheye image and the image in the clipped area is subjected to distortion correction to provide a user with a distortionless image (corrected image).

SUMMARY OF THE INVENTION

In accordance with one aspect of the present invention, there is provided an image display device comprising: a display unit; a computing device which is operable to function as units comprising: a clipping unit which clips an image of one portion from a fisheye image captured by using a fisheye lens as a clipping target area; a correcting unit which corrects distortion of the image clipped by the clipping unit; a specifying unit which specifies a vertical direction of a corrected image acquired by the correcting unit, based on orientation information when the fisheye image is captured; and a display control unit which controls the corrected image to be displayed on the display unit based on the vertical direction specified by the specifying unit.

In accordance with another aspect of the present invention, there is provided an image display method for an image display device including a display unit, comprising: clipping an image of one portion from a fisheye image captured by using a fisheye lens as a clipping target area; correcting distortion of the clipped image; specifying a vertical direction of the corrected image, based on orientation information when the fisheye image is captured; and controlling the corrected image to be displayed on the display unit based on the specified vertical direction.

In accordance with another aspect of the present invention, there is provided a non-transitory computer-readable storage medium having stored thereon a program that is executable by a computer in an image display device including a display unit, the program being executable by the computer to actualize functions comprising: clipping an image of one portion from a fisheye image captured by using a fisheye lens as a clipping target area; correcting distortion of the clipped image; specifying a vertical direction of the corrected image, based on orientation information when the fisheye image is captured; and controlling the corrected image to be displayed on the display unit based on the specified vertical direction.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2A is a block diagram showing the structure of the imaging device 10;

FIG. 2B is a block diagram showing the structure of the main body device 20;

FIG. 2C is a block diagram showing details of the control section 21 shown in FIG. 2B;

FIG. 11 is a diagram for describing a display format table 23C;

DETAILED DESCRIPTION OF THE PREFERRED EMBODIMENT

An embodiment of the present invention will hereinafter be described with reference to FIG. 1 to FIG. 12C.

Figure 1A:
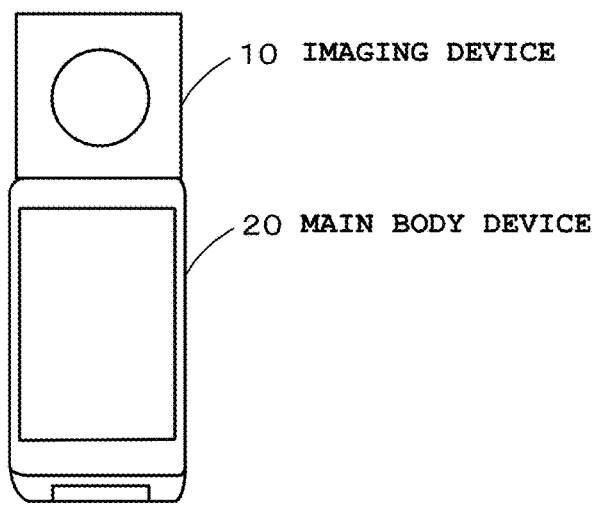
FIG. 1A is an external view of a digital camera where the present invention has been applied as an image display device, in which an imaging device 10 and a main body device 20 constituting the digital camera have been integrally combined.
Figure 1B:
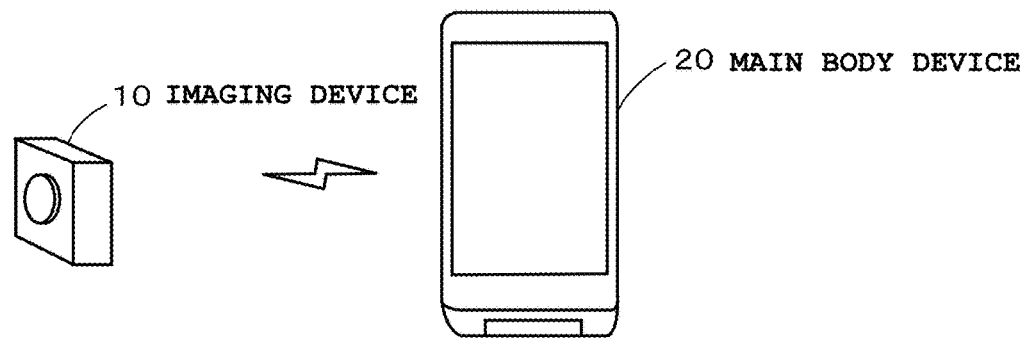
FIG. 1B is an external view showing a state where the imaging device 10 and the main body device 20 have been separated from each other.

The present embodiment is an example where the present invention has been applied to a digital camera as an image display device. This digital camera is a separate-type digital camera having an imaging device 10 including an imaging section described below and a main body device 20 including a display section described below, and the imaging device 10 and the main body device 20 are separable from each other. FIG. 1A is a diagram showing a state in which the imaging device 10 and the main body device 20 have been integrally combined. FIG. 1B is a diagram showing a state in which the imaging device 10 and the main body device 20 have been separated from each other. Between the imaging device 10 and the main body device 20 forming the separate-type digital camera, pairing (wireless connection recognition) is possible by using wireless communication available for each device. As the wireless communication, wireless LAN (Wi-Fi) or Bluetooth (registered trademark) is used. The main body device 20 receives and acquires an image captured by the imaging device 10 and displays this captured image (live view image).

FIG. 2A is a block diagram showing the structure of the imaging device 10, and FIG. 2B is a block diagram showing the structure of the main body device 20.

In FIG. 2A, the imaging device 10 includes a control section 11, a power supply section 12, a storage section 13, a communication section 14, an operation section 15, an imaging section or unit 16, and an orientation detecting section 17. The control section 11 operates by power supply from the power supply section (secondary battery) 12, and controls the entire operation of the imaging device 10 in accordance with various programs in the storage section 13. In the control section 11, a CPU (Central Processing Unit), memories, and the like not depicted are provided. The storage section 13 is structured to have, for example, a ROM (Read Only Memory), flash memory, and the like, and has stored therein a program for achieving the present embodiment, various applications, and the like. The communication section 14 transmits a captured image to the main body device 20, and receives an operation instruction signal and the like from the main body device 20. The operation section 15 includes a basic operation key (hardware key) such as a power supply switch.

The imaging section 16 constitutes a camera section which can photograph a subject with high definition. The imaging section 16 has a lens unit 16A, which is provided with a fisheye lens 16B, an image sensor 16C, and the like. In the camera of the present embodiment, a normal imaging lens (omitted in the drawing) and the fisheye lens 16B are interchangeable. In the depicted example, the fisheye lens 16B has been attached in place of the normal imaging lens (omitted in the drawing). The fisheye lens 16B is, for example, a circumferential fisheye lens formed of a lens system constituted by three lenses and capable of wide-range imaging with a viewing angle of substantially 180 degrees (full-circular fisheye lens). An image captured by this fisheye lens 16B is a circular image as a whole.

In this embodiment, a projective method has been adopted, and therefore an image captured by the fisheye lens 16B (fisheye image) is significantly distorted from its center toward its end. When a subject image (optical image) from the fisheye lens 16B is formed at the image sensor (for example, CMOS (Complementary Metal Oxide Semiconductor) or CCD (Charge-Coupled Device)) 16C, an image signal (analog-value signal) acquired by optical/electrical conversion by the image sensor 16C is converted into a digital signal (image signal) by an A/D converting section omitted in the drawing, subjected to predetermined image display processing, and then transmitted to the main body device 20 for monitor display.

The orientation detecting section 17 is a triaxial acceleration sensor of a piezo-resistance type, capacitance-detection type, or the like for detecting acceleration applied to the imaging device 10, detecting acceleration of gravity in three axis directions (X, Y, and Z directions) orthogonal to one another, and applying acceleration components in the X, Y, and Z directions detected in accordance with the orientation of the imaging device 10 to the control section 11. Based on a signal indicating the acceleration components outputted from the orientation detecting section 17, the control section 11 detects various orientations (described below) of the imaging device 10. The orientation detecting section 17 detects, as a vertical direction, a detected gravity direction or a direction in a range of predetermined angles with respect to the gravity direction. Here, for example, the gravity direction is taken as a minus direction, that is, a minus direction is taken as the gravity direction. Note that, although the above-described predetermined angles are set in consideration of the inclination of the ground, they may be arbitrarily changed by a user operation.

In FIGS. 2B and 2C, the main body device 20 has a replay function for replaying an image captured by using a fisheye lens or the like, and includes a control section 21, a power supply section 22, a storage section 23, a communication section 24, an operation section 25, a touch display section 26, and an orientation detecting section 27. The control section, or computing device, 21 operates by power supply from the power supply section (secondary battery) 22 and controls the entire operation of the main body device 20 in accordance with various programs in the storage section 23. In the control section 21, a CPU (Central Processing Unit), memories, and the like not depicted are provided. The storage section 23 is structured to have, for example, a ROM, flash memory, and the like, and includes a program memory 23A having stored therein a program for achieving the present embodiment, various applications, and the like, a work memory 23B for temporarily storing various information (for example, a flag) required for the main body device 20 to operate, a display format table 23C described below, and the like.

The storage section 23 may be structured to include a removable portable memory (recording medium) such as an SD (Secure Digital) card or an IC (Integrated Circuit) card for recording and storing fisheye images and the like, or may be structured to include, although not shown, a storage area on a predetermined server apparatus side in a case where the camera is connected to a network by a communication function. The communication section 24 transmits and receives various data to and from the imaging device 10. The operation section 25 includes various push-button keys, such as a power supply button, release button, and setting buttons for setting photographing conditions such as exposure and shutter speed. The control section 21 performs processing in accordance with an input operation signal from the operation section 25 and transmits an input operation signal to the imaging device 10.

The touch display section 26 is structured to have a touch panel 26B arranged and laminated on a display 26A such as a high-definition liquid-crystal display. On the touch display section 26, various software keys (touch keys) are allocated and arranged, and their function names are displayed. Also, a touch operation with a finger or the like is sensed, and an operation signal is inputted in accordance with the touched point. The display screen of the touch display section 26 serves as a monitor screen (live view screen) for displaying an image (fisheye image) captured by the fisheye lens 16B and the like in real time, or a replay screen for replaying a captured image (fisheye image) and the like. The orientation detecting section 27 is a triaxial acceleration sensor for detecting acceleration applied to the main body device 20, detecting gravity acceleration in three axis directions (X, Y, and Z directions) orthogonal to one another, and applying acceleration components in the X, Y, and Z directions detected in accordance with the orientation of the main body device 20 to the control section 21. Based on a signal indicating the acceleration components outputted from the orientation detecting section 27, the control section 21 detects various orientations of the main body device 20 (various orientations of the screen constituting the touch display section 26).

FIG. 3A to FIG. 3D are diagrams for describing orientations of the imaging device 10.

Figure 3A:
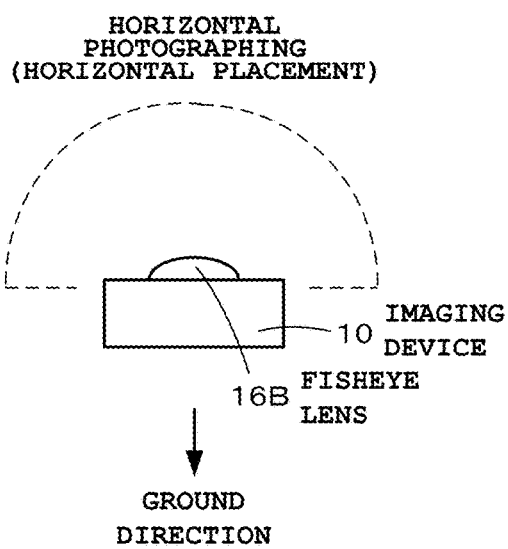
FIG. 3A to FIG. 3C are diagrams for describing various orientations of the imaging device 10.
Figure 3B:
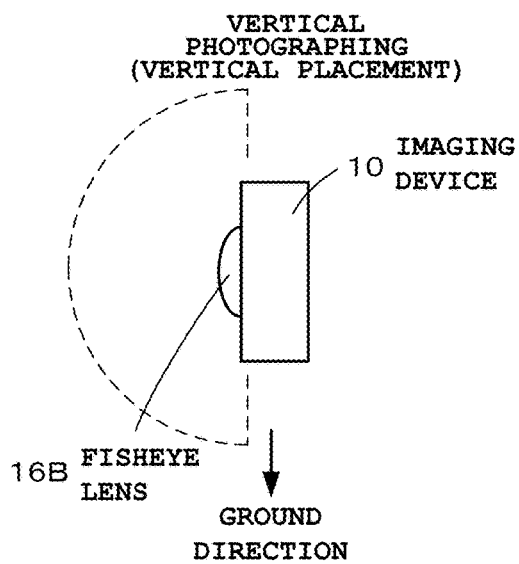

For example, the imaging device 10 has a box shape as a whole. At its center at the front, the fisheye lens 16B is arranged. FIG. 3A shows a case in which the front direction of the camera (optical axis direction of the fisheye lens 16B) has been oriented to the sky, that is, image capturing is performed with the optical axis direction of the fisheye lens 16B being substantially opposite to the gravity direction (horizontal photographing is performed). FIG. 3B shows a case in which the optical axis direction of the fisheye lens 16B is substantially orthogonal to the gravity direction, that is, image capturing is performed such that the camera is oriented to be substantially perpendicular to the ground (vertical photographing is performed). Here, a hemisphere indicated by a broken line in the drawings represents the imaging range of the fisheye lens 16B having a viewing angle of substantially 180 degrees.

Figure 3C:
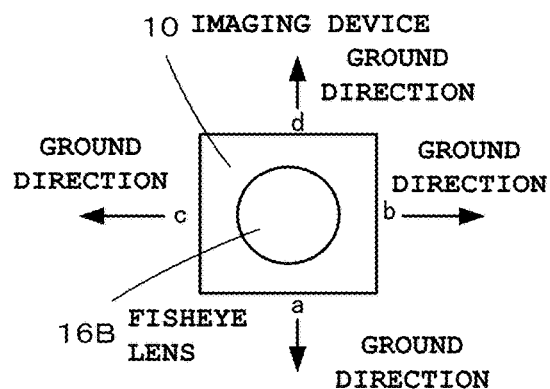
Figure 3D:
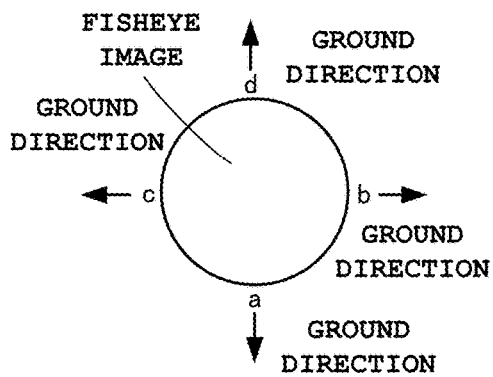
FIG. 3D is a diagram of a relation between a fisheye image captured with the imaging device 10 being oriented (camera orientation) as depicted in FIG. 3C and a ground direction at the time of the image capturing.

FIG. 3C depicts orientations of the imaging device 10 (camera orientation) in vertical photographing. The orientations depicted in this example include an orientation of the camera when its lower surface a is oriented to the ground direction, an orientation of the camera when its right side surface b is oriented to the ground direction, an orientation of the camera when its left side surface c is oriented to the ground direction, and an orientation of the camera when its upper surface d is oriented to the ground direction. FIG. 3D is a diagram of a relation between a fisheye image captured with each camera orientation depicted in FIG. 3C and the ground direction. In the drawing, each arrow direction represents the ground direction in accordance with each orientation of the imaging device 10. For example, when the lower surface of the camera in vertical photographing is oriented to the ground direction in "a" (when the ground direction is "a" in the camera orientation of FIG. 3C), the direction of "a" in the fisheye image of FIG. 3D is the ground direction. Regarding the orientation of the imaging device 10, the control section 11 of the imaging device 10 in image capturing detects, based on detection results of the orientation detecting section 17, horizontal photographing (horizontal placement) in FIG. 3A or vertical photographing (vertical placement) in FIG. 3B, and a relevant one of the camera orientations "a" to "d" in FIG. 3C. When a captured image is recorded and stored in the main body device 20, that is, when a captured image is subjected to predetermined image processing (such as development processing) to generate a photographic image for recording and storage, camera orientation information at the time of the image capturing is recorded and stored by being added to the photographic image.

Figure 4A:
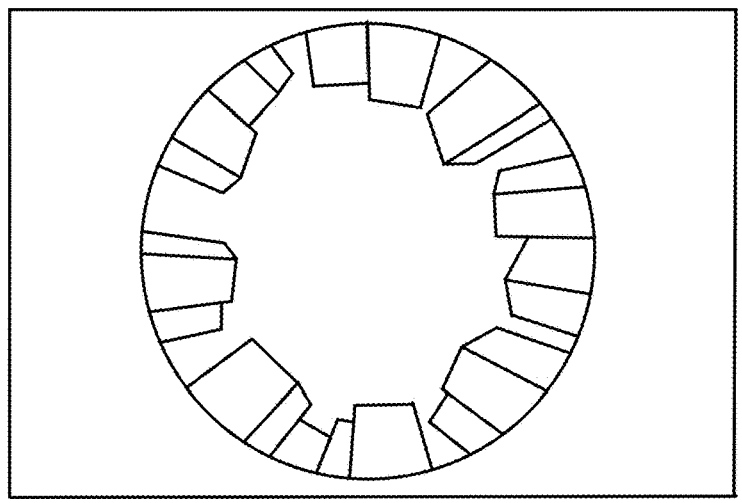
FIG. 4A is a diagram showing an image (fisheye image) captured by a fisheye lens 16B.

FIG. 4A shows an image (fisheye image) captured by the fisheye lens 16B and displayed on a replay screen of the touch display section 26 of the main body device 20.

This fisheye image is an image captured by horizontal photographing depicted in FIG. 3A. In the shown example, a group of buildings standing in a city has been imaged with the camera being oriented toward the sky. In this case, as the fisheye lens 16B, a circumferential fisheye lens capable of wide-range imaging with a viewing angle of substantially 180 degrees has been adopted. Therefore, the fisheye image (fisheye image with a characteristic distortion) is a circular image as a whole.

Figure 4B:
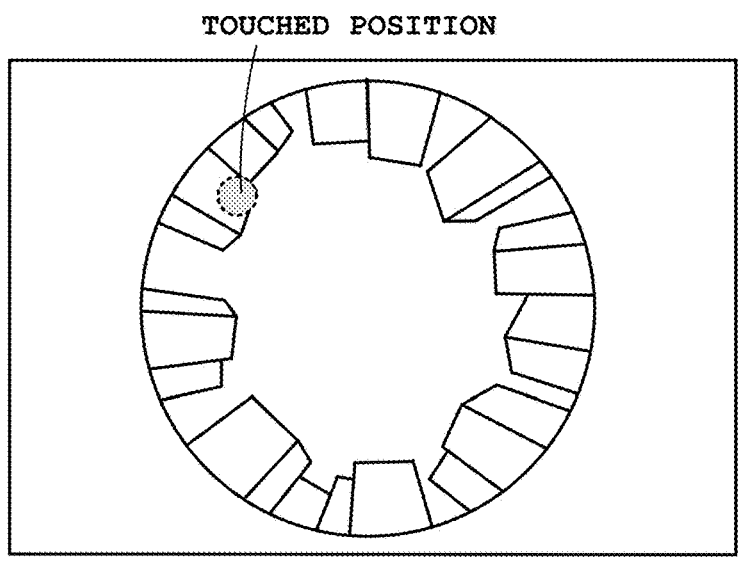
FIG. 4B is a diagram in which an arbitrary desired point on the fisheye image displayed on the touch display section 26 has been touched.

FIG. 4B is a diagram in which an arbitrary user-desired point (arbitrary point on the fisheye image) has been touched with a finger or the like with the fisheye image of FIG. 4A being displayed on the replay screen of the touch display section 26.

As depicted in FIG. 4A, a peripheral portion (edge) away from the center of the fisheye image is a portion imaged in a wide range, and has a large distortion. Also, the image of the peripheral portion has been reduced compared with the center of the fisheye image. Therefore, it is extremely difficult for the user to visually confirm the peripheral portion in detail.

In this case, when the user touches an arbitrary point on the fisheye image (point where details are desired to be confirmed) with a finger or the like, such as when the user touches an arbitrary point on a peripheral portion away from the center of the fisheye image with a finger or the like as depicted in FIG. 4B, the control section 21 specifies an area including this touched point (for example, a substantially trapezoidal shape) as a clipping target area, and performs distortion correction on an image in the clipping target area. Note that, although this "clipping target area" herein is a range (read-out target area or read target area) where an image of one portion is read out from a fisheye image as a display target, it may be a range where an image in this area is extracted from the fisheye image (the same applies to the following descriptions).

Figure 5:
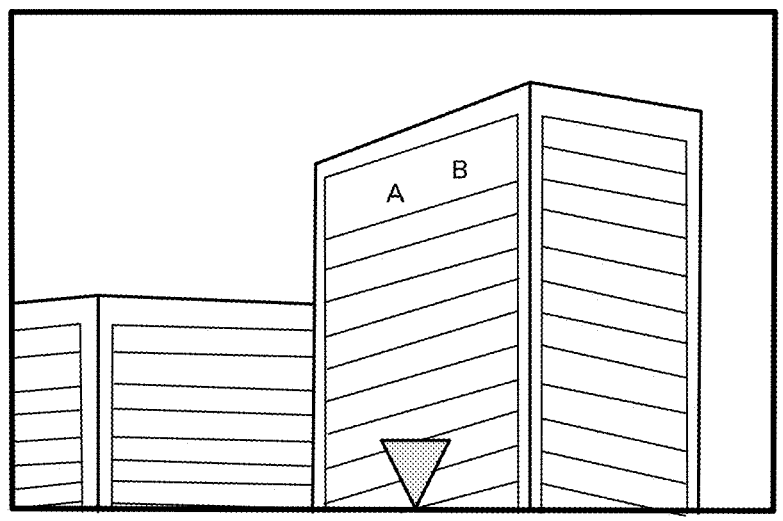
FIG. 5 is a diagram showing a state where a corrected image after distortion correction on an image in a clipped area has been displayed.

FIG. 5 is a diagram showing a corrected image after distortion correction is performed on an image clipped from a fisheye image captured by horizontal photographing depicted in FIG. 3A. By switching from entire display for the fisheye image such as that depicted in FIG. 4A, the corrected image is displayed in an enlarged state. In the depicted example, by the enlargement display of the image after the correction (corrected image), even a building name (AB), which is difficult to be visually confirmed in the entire display of the fisheye image, can be visually confirmed clearly.

As processing for correcting distortion of a fisheye image, in the present embodiment, a technique is used in which a plane in contact at an arbitrary point on a virtual spherical model is taken as a screen, points on the virtual spherical model are subjected to coordinate transformation to points on the plane screen, whereby distortion of the fisheye image is corrected. In this processing of correcting distortion of a fisheye image (fisheye distortion correction processing), a known technique generally used in image processing is used, and therefore specific descriptions of this technique is omitted herein. Note that the fisheye distortion correction processing is not limited to the technique described above, and may be arbitrarily determined.

In the corrected image, a ground mark (inverted triangle) indicating the ground direction is added and displayed. Here, when a fisheye image has been captured by horizontal photographing depicted in FIG. 3A, the ground direction of an image clipped from the fisheye image is a direction from the center of the fisheye image toward its edge. That is, irrespective of the ground direction at the time of the capturing of the fisheye image, the direction from the center of the fisheye image toward its edge is the ground direction of the clipped image. Therefore, in its corrected image, the ground mark (inverted triangle) is added in this direction.

Figure 6:
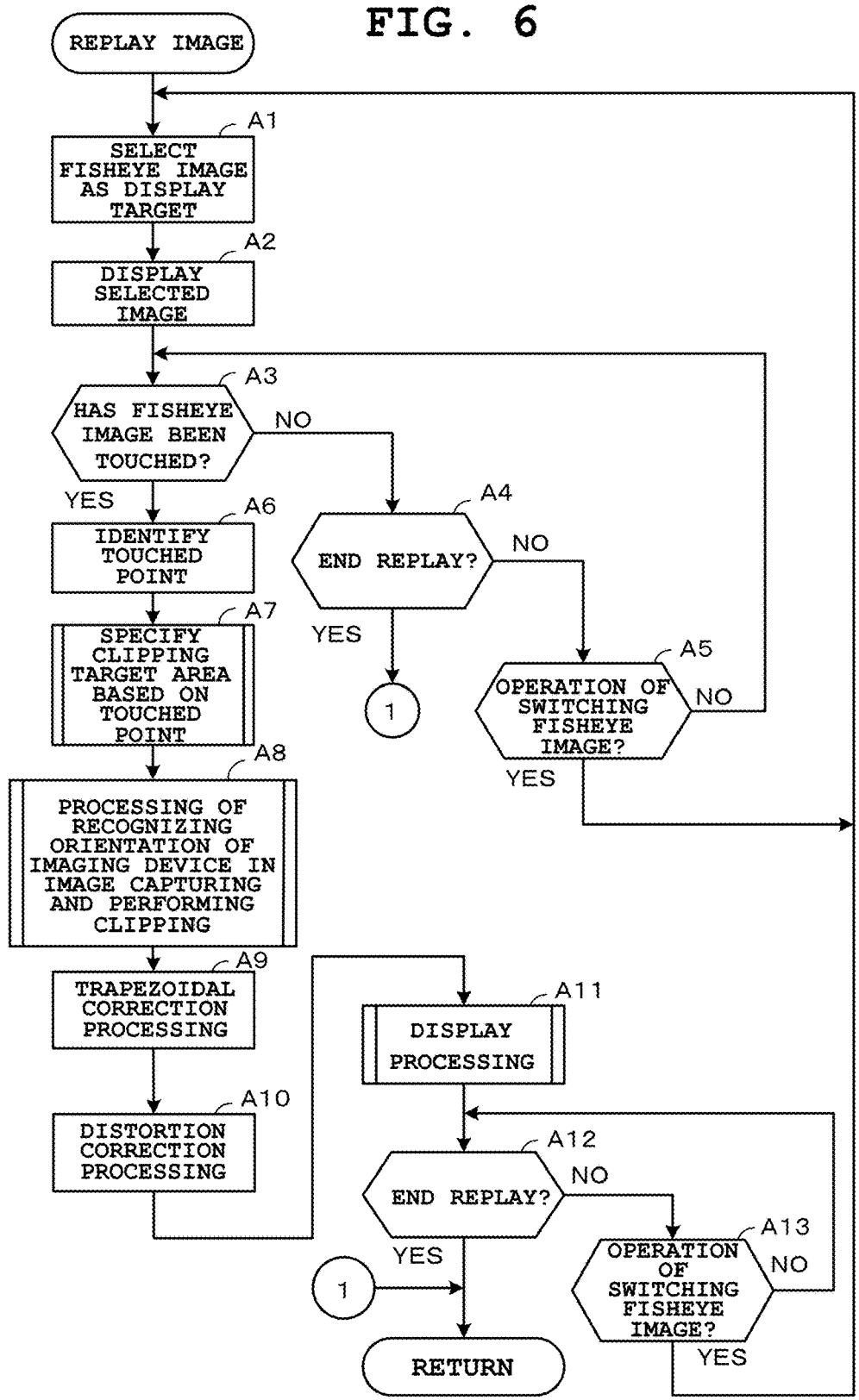
FIG. 6 is a flowchart of an operation that is started when a current mode is switched to a replay mode.

Next, the operation concept of the digital camera in the present embodiment is described with reference to flowcharts depicted in FIG. 6 to FIG. 9. Here, each function described in these flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. FIG. 6 is a flowchart outlining the operation of the characteristic portion of the present embodiment from among all of the operations of the digital camera. After exiting this flow of FIG. 6, the control section 21 returns to the main flow (omitted in the drawing) of the overall operation.

Here, prior to description of the characteristic operation of the main body device 20, a transmission/reception operation between the imaging device 10 and the main body device 20 in image capturing is briefly described.

When a photographing instruction is transmitted from the main body device 20 to the imaging device 10, the imaging device 10 transmits an image captured in response to the photographing instruction to the main body device 20. Here, the imaging device 10 adds camera orientation information detected by the orientation detecting section 17 at the time of the image capturing to the captured image, and then transmits the resultant image. Upon receiving the captured image with the orientation information from the imaging device 10, the main body device 20 performs development processing on that captured image to generate a photographic image, performs image compression processing for conversion into a standard file format, and then records and stores the resultant image in the recording medium of the storage section 23.

FIG. 6 is a flowchart of an operation that is started when a current mode is switched to a replay mode.

First, the control section 21 of the main body device 20 causes a list of various images (stored images) captured by the fisheye lens 16B or the like and recorded and stored to be displayed by menu display. Next, when a desired image (for example, a fisheye image) is selected as a display target from the list display (menu display) by a user operation (Step A1), the control section 21 causes the selected image (fisheye image) to be displayed on the replay screen of the touch display section 26 (Step A2). In this state, the control section 21 judges whether the selected image (fisheye image) being displayed has been touched (Step A3), whether an instruction for ending the replay has been given (whether an operation for cancelling the replay mode has been performed) (Step A4), and whether a switching operation for providing an instruction to switch the selected image (fisheye image) has been performed (Step A5).

Here, when an instruction to end the replay has been given (YES at Step A4), the control section 21 exits from the flow of FIG. 6. When an operation for switching the fisheye image has been performed (YES at Step A5), the control section 21 returns to the initial Step A1. When a touch operation, an operation for providing an instruction to end the replay, and an operation for providing an instruction to switch the fisheye image have not been performed (NO at Steps A3 to A5), the control section 21 returns to the above-described Step A3 to enter an operation standby state. Here, when an arbitrary point on the fisheye image is touched to arbitrarily clip an image of one portion from the fisheye image (YES at Step A3), the control section 21 identifies the touched point on the touch panel 26B (Step A6) and, based on the identified touched point, performs processing of specifying a clipping target area on the fisheye image (Step A7).

Figure 7:
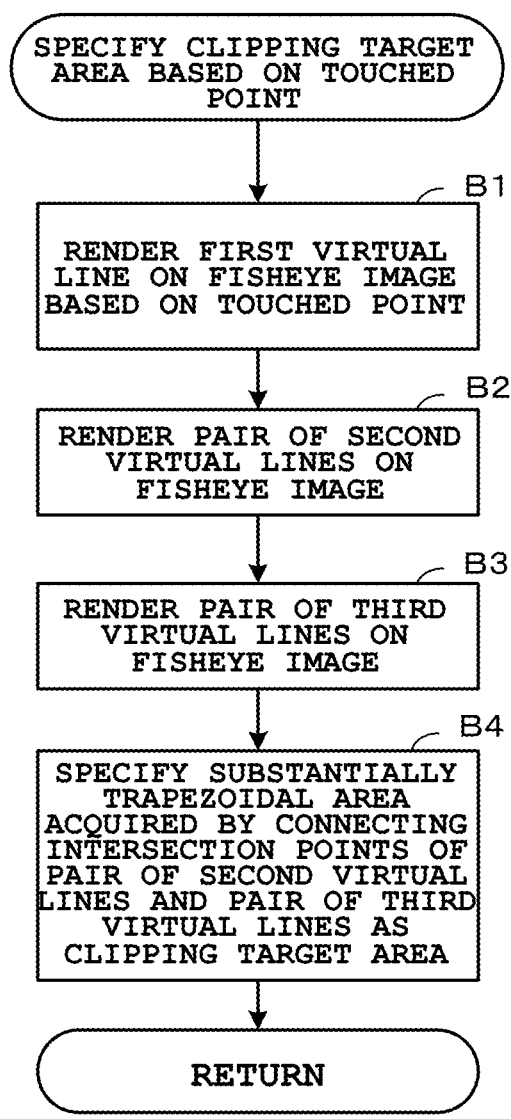
FIG. 7 is a flowchart for describing details of processing of specifying a clipping target area on a fisheye image based on a touched point (Step A7 of FIG. 6)
Figure 10A:
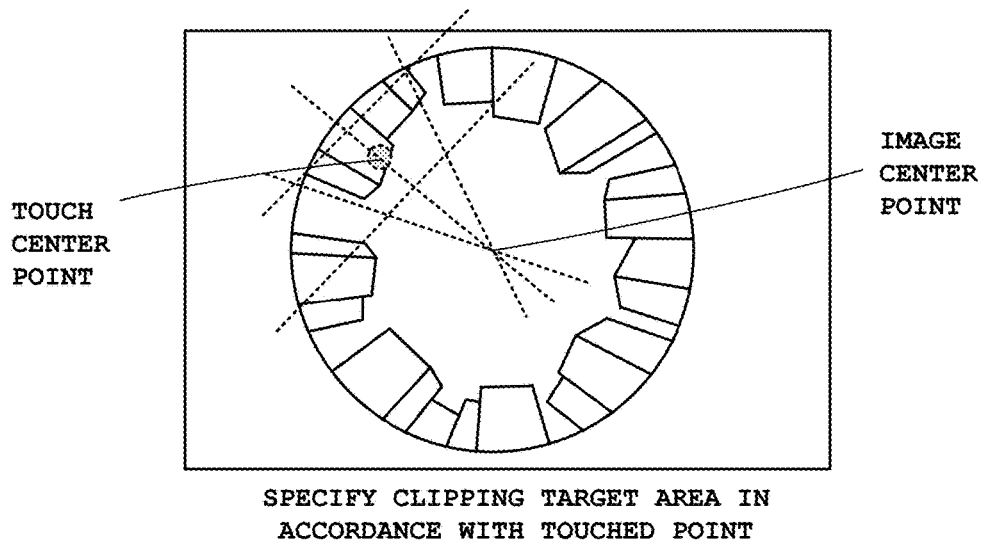
FIG. 10A and FIG. 10B are diagrams for specifically describing processing of specifying a clipping target area.
Figure 10B:
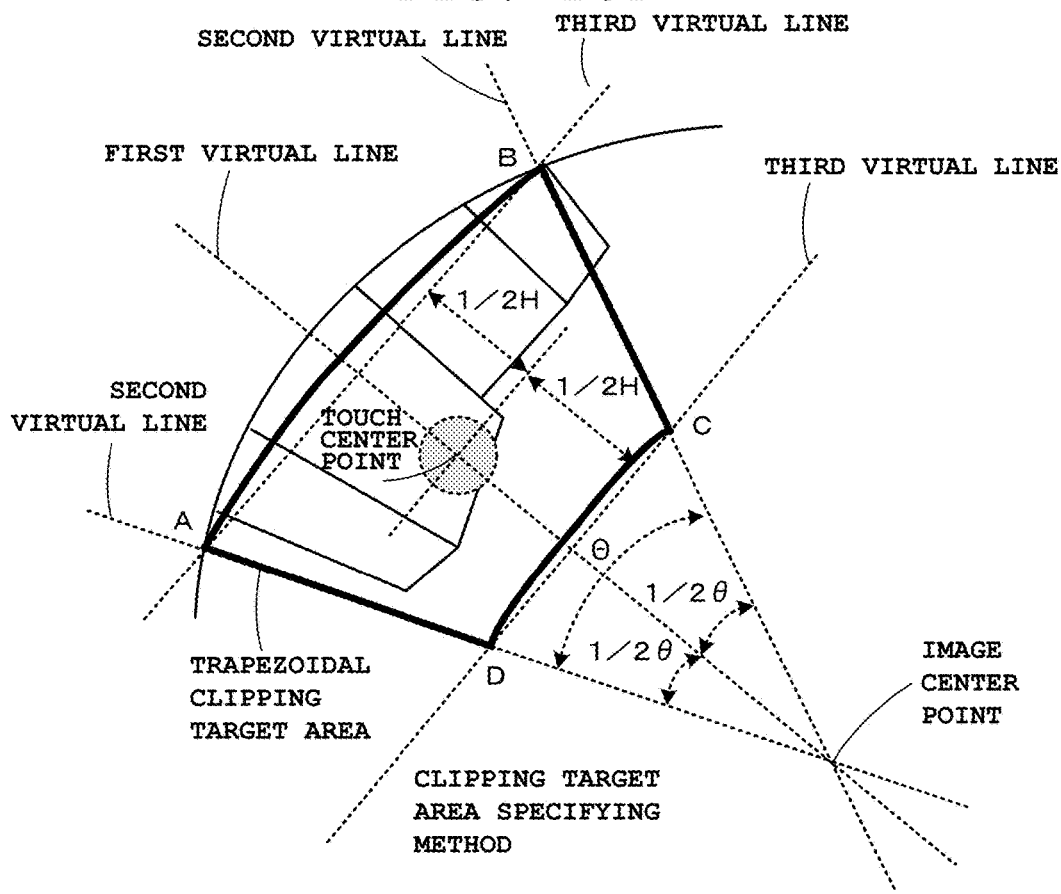

FIG. 7 is a flowchart for describing in detail the processing of specifying a clipping target area based on the touched point (Step A7 of FIG. 6). FIG. 10A is a diagram showing virtual lines of three types rendered to specify a clipping target area from a fisheye image captured by horizontal photographing using the fisheye lens 16B as depicted in FIG. 4A. FIG. 10B is a diagram showing a clipping target area specified by the virtual lines of three types.

First, based on the touched point, the control section 21 renders a line segment connecting the touched point and the center point of the fisheye image as a first virtual line (straight line) (Step B1). Next, the control section 21 renders a pair of second virtual lines (straight lines) on the fisheye image (Step B2). That is, by the center of the fisheye image being taken as an apex of a triangle and its vertical angle (θ) being divided into two by the first virtual line serving as a median line, the control section 21 renders a pair of sides as second virtual lines. In addition, the control section 21 renders a pair of third virtual lines (curved lines slightly bulging outward) on the fisheye image (Step B3). That is, as third virtual lines, the control section 21 renders a pair of line segments spaced at a predetermined distance (½ H) with the touched point as a boundary, in the center direction of the fisheye image and its opposite direction. Then, a clipping unit 21A of the control section 21 specifies a substantially trapezoidal area acquired by connecting intersection points A, B, C, and D of the pair of second virtual lines and the pair of third virtual lines as a clipping target area (Step B4).

Since the fisheye image has a characteristic in which the photographing range is widened as being away from its center (toward its edge), when the clipping target area is set as a trapezoidal shape or a substantially trapezoidal shape and converted into a rectangular image by trapezoidal distortion correction with its upper side being directed toward the center of the fisheye image and its lower side being directed toward the edge of the fisheye image, a shortage of pixel components in an image portion corresponding to a lower side portion of the trapezoid can be prevented.

When the processing of specifying a clipping target area (Step A7 of FIG. 6) is ended as described above, the control section 21 proceeds to the next Step A8, and performs processing of recognizing camera orientation information at the time of the image capturing and clipping an image in the clipping target area (processing in FIG. 8 described below). Then, a correcting unit 21B of the control section 21 performs trapezoidal distortion correction processing (projective transformation processing) on the image in the clipping area (Step A9). This trapezoidal distortion correction processing is performed not only when the clipping target area is a trapezoid but also when the clipping target area is a rectangle substantially similar to a trapezoid. As the trapezoidal distortion correction processing, a known technique generally used in image processing is used, and therefore its specific description is omitted herein. Furthermore, the control section 21 performs processing of correcting distortion of the fisheye image (Step A10). In this fisheye distortion correction processing, a plane in contact with an arbitrary point on a virtual spherical model is taken as a screen for coordination transformation, as described above. Then, the control section 21 proceeds to processing of displaying the fisheye image and its corrected image (processing in FIG. 9 described below) (Step A11).

Figure 8:
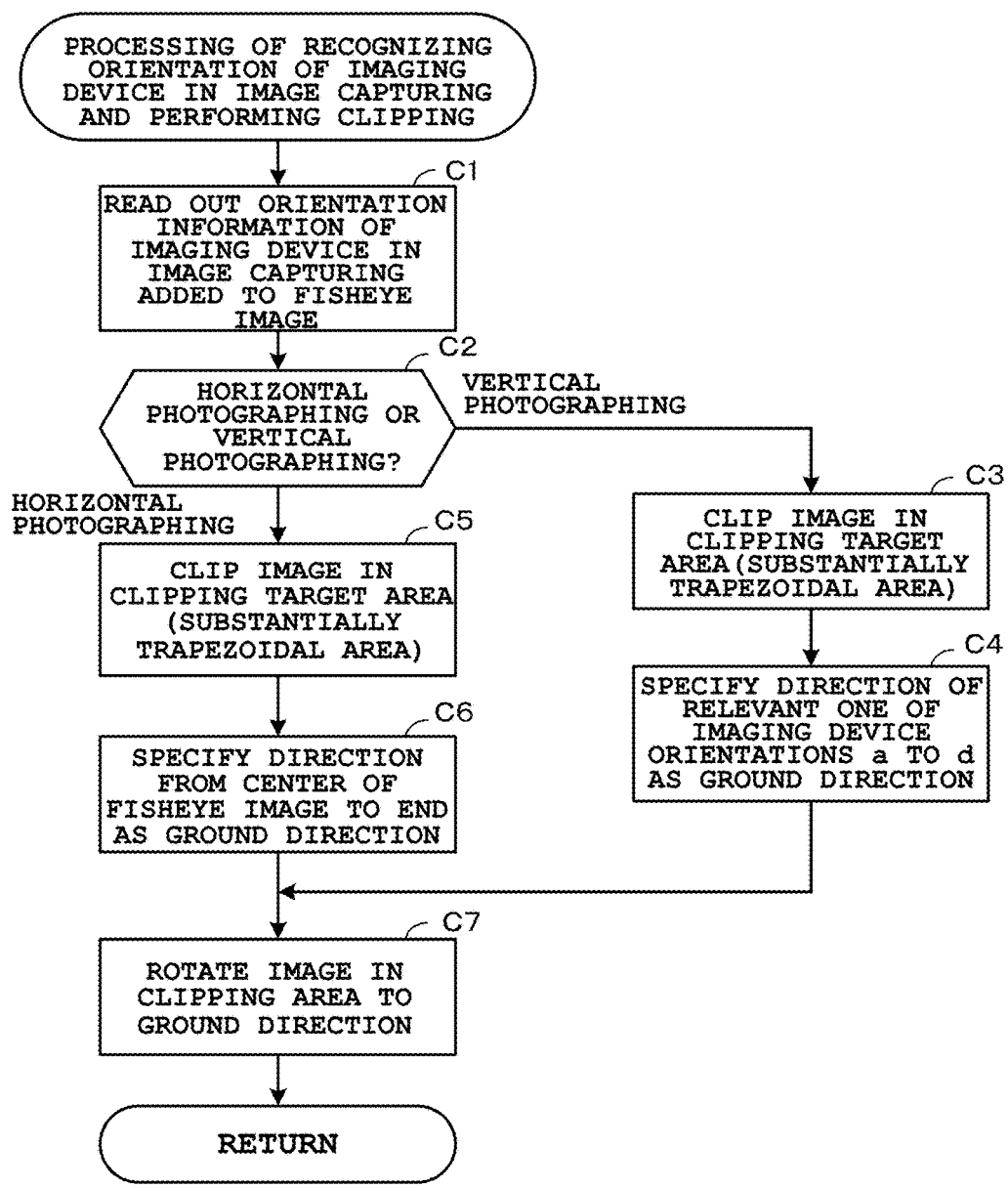
FIG. 8 is a flowchart for describing details of processing of recognizing a camera orientation in image capturing and clipping an image in a clipping target area (Step A8 of FIG. 6)

FIG. 8 is a flowchart for describing in detail the processing of recognizing a camera orientation at the time of the image capturing and clipping an image in the clipping target area (Step A8 of FIG. 6).

First, when the selected image (fisheye image) is being displayed on the replay screen of the touch display section 26, the control section 21 reads out camera orientation information at the time of the image capturing added in advance to the fisheye image (Step C1), and judges whether horizontal photographing has been detected or vertical photographing has been detected, based on the orientation information (Step C2). In the case of vertical photographing of the fisheye image (vertical photographing at Step C1), the control section 21 clips an image from the identified clipping target area (substantially trapezoidal area) (Step C3), and specifies the direction of a relevant one of the camera orientations "a" to "d" as the ground direction (Step C4).

On the other hand, when horizontal photographing of the fisheye image is detected based on the camera orientation information (horizontal photographing at Step C1), the control section 21 clips an image from the identified clipping target area (substantially trapezoidal area) (Step C5), and specifies, by a specifying unit 21C of the control section 21, a direction from the center of the fisheye image toward its edge as the ground direction of the clipped image (Step C6) irrespective of the ground direction at the time of the capturing of the fisheye image. Then, the control section 21 performs processing of rotating the clipped image to the specified ground direction (Step C7). Note that the control section 21 may detect vertical photographing or horizontal photographing by, for example, judging whether the orientation information (measurement value of the acceleration sensor) added to the fisheye image exceeds a predetermined threshold. Also, as a matter of course, another detecting method may be used.

Figure 9:
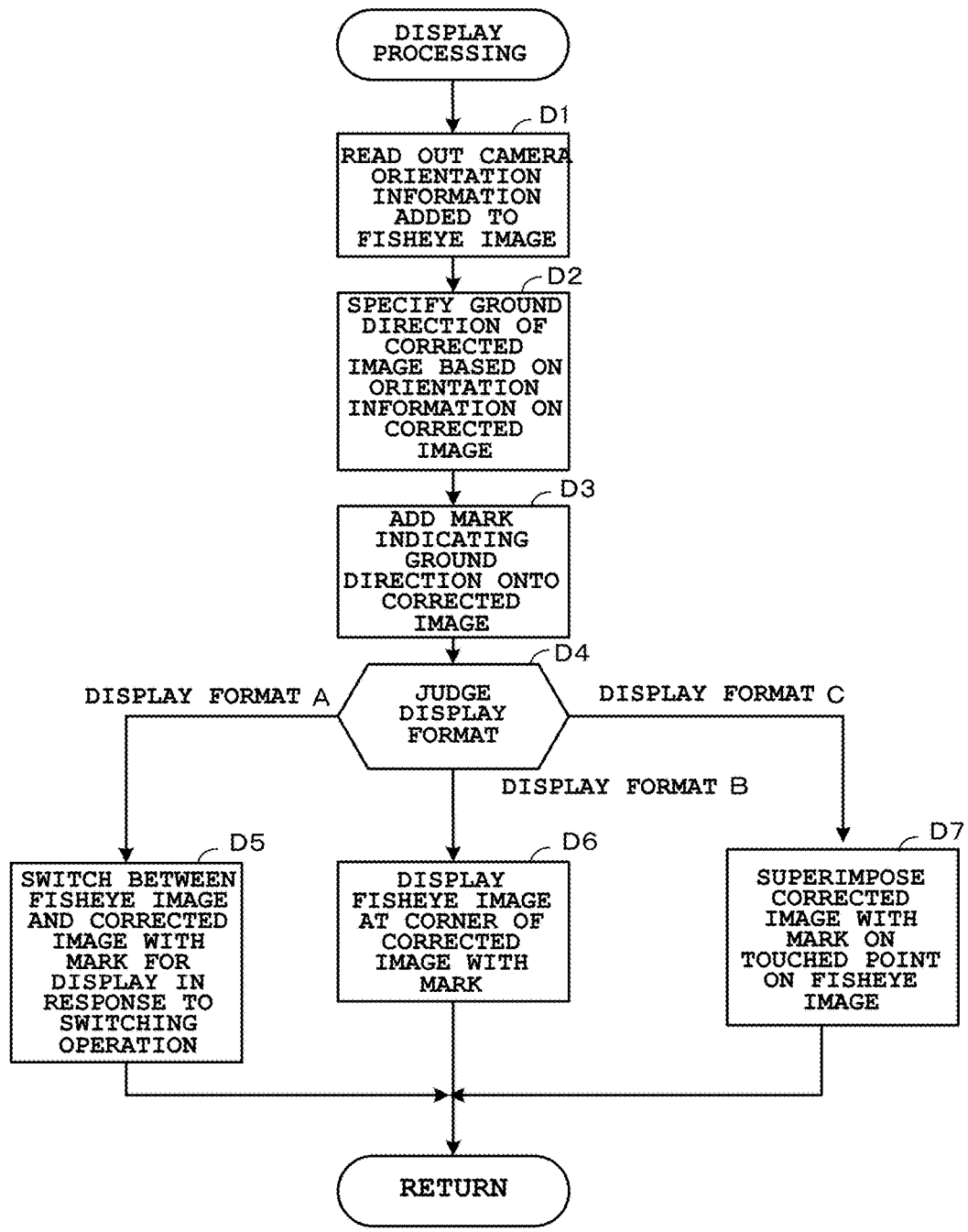
FIG. 9 is a flowchart for describing details of display processing (Step A11 of FIG. 6)

FIG. 9 is a flowchart for describing the display processing in detail (Step A11 of FIG. 6).

First, the control section 21 reads out the camera orientation information added to the fisheye image (Step D1), and specifies a ground direction of the corrected image based on the orientation information (Step D2). That is, when the camera orientation information indicates "horizontal photographing", the control section 21 specifies an outer direction (direction to be away from the center) of the fisheye image as the ground direction of the corrected image. When the camera orientation information indicates "vertical photographing" and the camera orientation is any one of "a" to "d", an orientation detecting unit 21E of the control section 21 specifies a relevant one of the orientations "a" to "d" as the ground direction of the corrected image. Then, the control section 21 adds a ground mark (inverted triangle mark) indicating the ground direction onto the corrected image (Step D3). Then, the control section 21 refers to the display format table 23C to judge the display format of the image (corrected image) in the clipping area (Step D4).

FIG. 11 is a diagram for describing the display format table 23C. The display format table 23C has stored therein a plurality of display formats for displaying a clipped portion (position) in a fisheye image when a corrected image acquired by clipping an image of a portion in a fisheye image and performing distortion correction on the image is displayed. The display format table 23C has fields of "display format", "details", and "selection flag". "Display format" indicates the type of display format. In the depicted example, three types "A", "B", and "C" have been stored as display formats. "Details" indicates details of a relevant display format. Display format "A" is a format in which a fisheye image and a corrected image are displayed such that they are switchable. Display format "B" is a format in which a fisheye image is displayed by being superimposed on apart of a corrected image. Display format "C" is a format in which a corrected image is displayed by being superimposed on the position of a clipping area in a fisheye image.

"Selection flag" indicates an arbitrary display method selected and specified in advance by the user from among the display formats of three types. In the drawing, "1 (flag ON)" corresponding to display format "B" indicates a display method selected by a user operation, and "0 (flag OFF)" indicates a display method not selected. In this case, when a plurality of predetermined display formats have been listed and displayed on the touch display section 26 (menu display), if any display format is touched (selected) on the menu screen, the control section 21 accesses the display format table 23C and turns ON ("1") the "selection flag" corresponding to the selected display format.

Figure 12A:
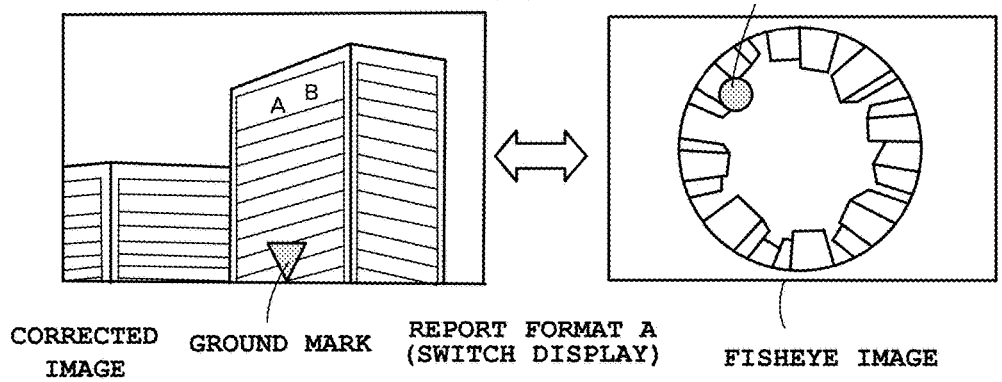
FIG. 12A is a diagram showing a display example in a display format A.

Here, when display format "A" has been selected by the user (the selection flag is ON) (Step D1), the control section 21 performs switching between the fisheye image and the corrected image with the ground mark (inverted triangle mark) for display on the replay screen of the touch display section 26 every time a switching operation is performed (Step D5). Here, the control section 21 performs switching between the fisheye image and the corrected image for display, with the ground direction of the fisheye image or the corrected image being aligned with a lower direction of the replay screen. FIG. 12A is a diagram showing an example of the switch display in display format A. In this case, the image (corrected image) in the clipping area is displayed by being enlarged over the entire replay screen. Therefore, the user can confirm even its detail, and can easily confirm the ground direction based on the addition of the ground mark (inverted triangle mark).

Figure 12B:
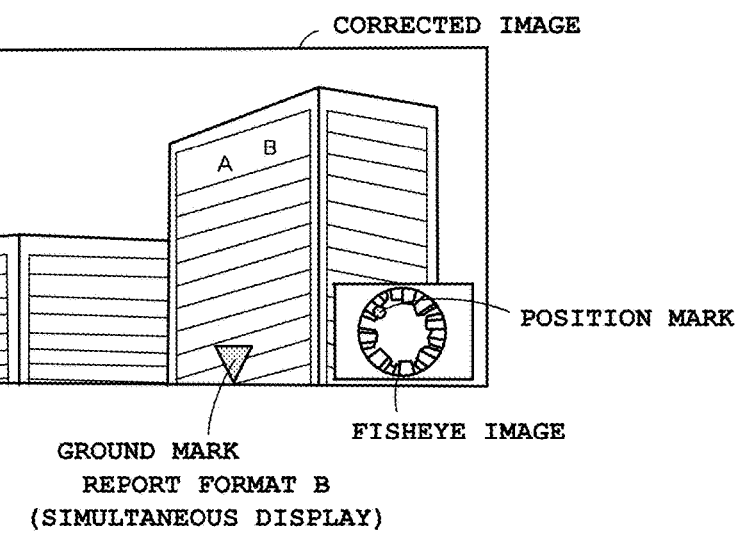
FIG. 12B is a diagram showing a display example in a display format B.

When display format "B" has been selected by the user (the selection flag is ON) (Step D1), the control section 21 causes, with the corrected image with the ground mark (inverted triangle mark) being displayed to be enlarged over the entire replay screen, the fisheye image reduced to a predetermined size to be simultaneously displayed at a corner of the replay screen (corrected image) in a superimposed state (Step D6). In this case, the ground direction of the fisheye image or the corrected image is aligned with the lower direction of the replay screen. FIG. 12B is a diagram showing an example of the simultaneous display in display format B. Here, the user can confirm even its detail, and can easily confirm the ground direction based on the addition of the ground mark (inverted triangle mark).

Figure 12C:
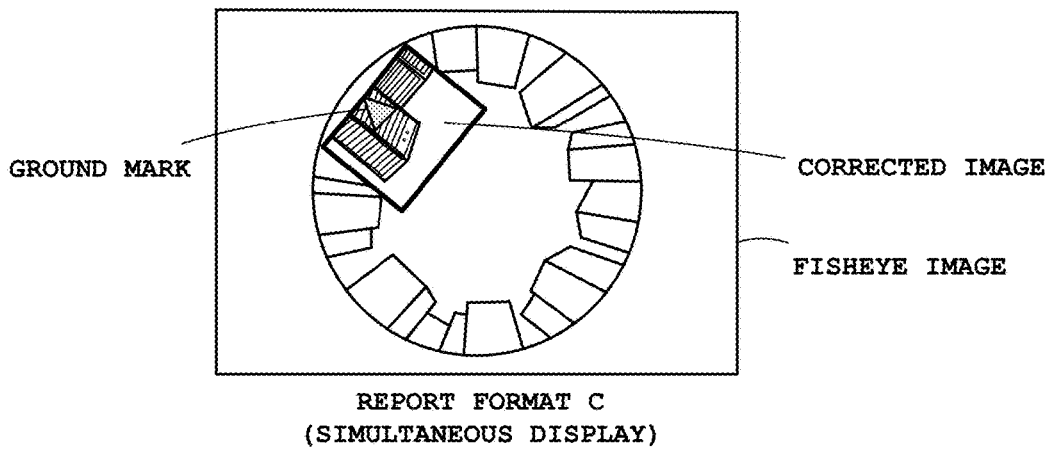
FIG. 12C is a diagram showing a display example in a display format C.

When display format "C" has been selected by the user (the selection flag is ON) (Step D1), the control section 21 causes the corrected image to be displayed by being superimposed on the position of the clipping area on the fisheye image (Step D7). In this case, the image (corrected image) in the clipping area is changed to a size of, for example, ⅛ or ¹/₁₂ of the entire fisheye image. Also, the fisheye image is displayed by being superimposed such that the center of the corrected image coincides with the touched point and the ground direction of the corrected image is the outer direction of the fisheye image (direction to be away from the fisheye image on a line connecting the center of the fisheye image and the center of the clipping area). FIG. 12C is a diagram showing an example of the simultaneous display in display format C. A display control unit 21D of the control section 21 controls the display orientation such that the ground direction of the corrected image is oriented outside the fisheye image. As a result, the user can easily confirm which portion (position) in the fisheye image has been clipped based on the corrected image displayed by being superimposed on the fisheye image, and can simultaneously confirm the corrected image and the ground direction based on the addition of the ground mark (inverted triangle mark).

When the display processing (Step A11 of FIG. 6) is thus ended, the control section 21 judges whether an instruction to end the replay has been given (whether an operation to cancel the replay mode has been performed) (Step A12), and judges whether a switching operation for providing an instruction to switch the selected image (fisheye image) has been performed (Step A13). Here, when an instruction to end the replay has been given (YES at Step A12), the control section 21 exits from the flow of FIG. 6. When an image switching operation has been performed (YES at Step A13), the control section 21 returns to the initial Step A1 and repeats the above-described operation.

As described above, in the present embodiment, when an image of one portion is clipped from an image (fisheye image) captured by using the fisheye lens 16B of the imaging device 10 as a display target and distortion correction is performed on the image in the clipping area for display, the control section 21 of the main body device 20 specifies the vertical direction of the corrected image based on orientation information at the time of the image capturing added to the fisheye image, and causes the corrected image to be rotated and displayed on the touch display section 26 based on the specified vertical direction. As a result of this configuration, when an image acquired by clipping one portion from a fisheye image and performing distortion correction thereon is displayed, the user can correctly confirm the vertical direction of the clipped image irrespective of the way of clipping the image.

In addition, when orientation information indicating horizontal photographing performed with the optical axis direction of the fisheye lens 16B being substantially perpendicular to the ground has been added to the fisheye image, the control section 21 of the main body device 20 specifies a direction to be away from the center of the fisheye image on a line connecting the center of the fisheye image and the clipping area (touched point) as the ground direction of the corrected image. As a result of this configuration, it is possible to accurately specify the ground direction of an image clipped from a fisheye image acquired by horizontal photographing.

Moreover, for superimposing display of the corrected image at the position of the clipping area in the fisheye image acquired by the horizontal photographing, the control section 21 of the main body device 20 controls a display orientation such that the ground direction of the corrected image is oriented outside the fisheye image. As a result of this configuration, the user can easily confirm the ground direction of a corrected image.

Also, the imaging device 10 includes the imaging section 16 which performs image capturing by using the fisheye lens 16B and the orientation detecting section 17 which detects the orientation of the imaging device 10, and orientation information detected by the orientation detecting section 27 is added to an image (fisheye image) captured by using the fisheye lens 16B. As a result of this configuration, from the orientation information of a fisheye image, the orientation of an image clipped from the fisheye image can be easily specified.

Moreover, when a fisheye image and its corrected image are to be simultaneously displayed, the control section 21 of the main body device 20 displays such that the vertical direction of the fisheye image and the vertical direction of the corrected image are aligned with each other. As a result of this configuration, a fisheye image and its corrected image can be easily viewed and compared.

Furthermore, when a fisheye image and its corrected image are to be subjected to switch display, the control section 21 of the main body device 20 displays such that the vertical direction of the fisheye image and the vertical direction of the corrected image are aligned with each other. As a result of this configuration, a corrected image can be displayed over the entire screen, which allows even details of the corrected image to be confirmed.

Still further, since the vertical direction of a corrected image is identifiably displayed, the user can easily confirm the vertical direction.

In addition, since the mark indicating the vertical direction is added into the corrected image, the user can intuitively confirm the vertical direction.

In the above-described embodiment, a ground direction is identifiably displayed in a corrected image. However, a sky direction may be identifiably displayed.

Also, when the vertical direction of a corrected image is to be identifiably displayed, the inverted triangle mark is added. However, any identifiable display can be adopted. For example, apart of a corrected image may blink or may be colored for display. Furthermore, in place of display, for example, a voice message indicating an upper-right corner, a lower-left corner, a lower-center corner, or the like may be outputted to guide to the vertical direction of a corrected image. Moreover, in the above-described embodiment, a ground direction can be confirmed based on the addition of the ground mark (inverted triangle mark) onto a corrected image. However, the ground mark may be omitted, and display may be performed in which the ground side of a corrected image is always on a predetermined direction side. For example, display may be performed in which the ground side of a corrected image is always on the lower side of the display screen.

Furthermore, in the above-described embodiment, in display format A, a fisheye image and a corrected image acquired by clipping one portion from the image and performing distortion correction thereon are switched for display every time a switching operation is performed. However, the fisheye image and the corrected image may be simultaneously displayed in parallel. In addition, a configuration may be adopted in which a mode where a fisheye image and a corrected image acquired by clipping from the image and performing distortion correction are switched for display every time a switching operation is performed and a mode in which a fisheye image and its corrected image are simultaneously displayed in parallel are switched by a user operation.

Also, in the above-described embodiment, a clipping target area to be specified is not limited to a trapezoid but may be any shape. For example, the size of a clipping target area may differ depending on a distance from the center of a fisheye image. That is, since this fisheye image has a characteristic in which the photographing range is widened as being away from its center (toward its edge), the clipping target area may be widened to have a trapezoidal shape so that pixel components are increased as being away (toward the edge), in consideration of its characteristic.

Also, in the above-described embodiment, a clipping target area is specified in accordance with a touched point such that the touched point is at the center of the clipping target area. However, a configuration may be adopted in which the entire fisheye image is logically divided into a plurality of areas in advance and, when the fisheye image is touched, an area where the touched point is located is specified as a clipping target area from among the divisional areas. Note that, when the entire fisheye image is to be divided into a plurality of areas in advance, the sizes of the respective divisional areas may differ in accordance with a distance from the center of the fisheye image, in consideration of the characteristic of the fisheye lens 16B.

Moreover, in the above-described embodiment, in the case of display format "C", superimposing display is performed such that the center of a corrected image coincides with a touched point on a fisheye image and the ground direction of the corrected image is the outer direction of the fisheye image, as depicted in FIG. 12C. However, the superimposing display may be conversely performed such that the ground direction of the corrected image coincides with the inner direction (center direction) of the fisheye image. Also, in the display example of FIG. 12C, one corrected image is displayed and superimposed on a fisheye image. However, when a plurality of points is touched on the fisheye image, an image clipped from each touched point and subjected to distortion correction may be displayed and superimposed.

Furthermore, in the above-described embodiment, the present invention has been applied to a separate-type camera having the imaging device 10 and the main body device 20 separately provided. However, the present invention may be applied to a compact camera having these devices integrally provided, or a fisheye-dedicated camera having the fisheye lens 16B fixed attached thereto.

Still further, in the above-described embodiment, the present invention has been applied to a digital camera as an image display device. However, the present invention is not limited thereto, and may be applied to a display-function-equipped personal computer, a PDA (personal digital assistance), a tablet terminal device, a portable telephone such as a smartphone, an electronic game machine, an electronic watch, a music player, and the like.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiment, it is intended that the invention be not limited by any of the details of the description therein but includes all the embodiments which fall within the scope of the appended claims.

What is claimed is:

1. An image display device comprising:
a display unit;
a computing device which is operable to function as units comprising:
a clipping unit which clips an image of one portion from a fisheye image captured by using a fisheye lens of an imaging unit as a clipping target area;
a correcting unit which corrects distortion of the image clipped by the clipping unit;
a specifying unit which specifies a vertical direction of a corrected image acquired by the correcting unit, based on orientation information when the fisheye image is captured; and
a display control unit which controls the corrected image to be displayed on the display unit based on the vertical direction specified by the specifying unit,
wherein the specifying unit specifies, as a ground direction of the corrected image, a direction to be away from center of the fisheye image on a line connecting the center of the fisheye image and the clipping target area, when the orientation information indicates horizontal photographing performed with an optical axis direction of the fisheye lens being substantially opposite to a gravity direction, and
wherein the display control unit, when controlling the corrected image to be displayed by being superimposed on a position of the clipping target area on the fisheye image captured by the horizontal photographing, controls a display orientation such that the ground direction of the corrected image specified by the specifying unit is oriented toward outside of the fisheye image.

2. The image display device according to claim 1, further comprising:
an imaging unit which performs image capturing by using the fisheye lens; and
an orientation detecting unit which detects an orientation of the image display device in the image captured by the imaging unit,
wherein the specifying unit specifies the vertical direction of the corrected image based on orientation information detected by the orientation detecting unit.

3. The image display device according to claim 2,
wherein the specifying unit, which specifies the vertical direction of the corrected image based on the orientation of the imaging unit, selects from two kinds of orientation of the imaging unit.

4. The image display device according to claim 1, wherein the display control unit, when controlling the fisheye image and the corrected image to be simultaneously displayed, controls display such that a vertical direction of the fisheye image and the vertical direction of the corrected image specified by the specifying unit are aligned with each other.

5. The image display device according to claim 1, wherein the display control unit, when controlling the fisheye image and the corrected image to be displayed by switch display, controls display such that a vertical direction of the fisheye image and the vertical direction of the corrected image specified by the specifying unit are aligned with each other.

6. The image display device according to claim 1, wherein the display control unit controls display such that the vertical direction of the corrected image specified by the specified unit is identifiable.

7. The image display device according to claim 6, wherein the display control unit performs control of adding a mark indicating the vertical direction to the corrected image.

8. An image display method for an image display device including a display unit, comprising:

clipping an image of one portion from a fisheye image captured by using a fisheye lens of an imaging unit as a clipping target area;

correcting distortion of the clipped image;

specifying a vertical direction of the corrected image, based on orientation information when the fisheye image is captured; and controlling the corrected image to be displayed on the display unit based on the specified vertical direction, wherein a direction to be away from center of the fisheye image on a line connecting the center of the fisheye image and the clipping target area is specified as a ground direction of the corrected image, when the orientation information indicates horizontal photographing performed with an optical axis direction of the fisheye lens being substantially opposite to a gravity direction, and wherein a display orientation is controlled such that the specified ground direction of the corrected image is oriented toward outside of the fisheye image, when the corrected image is controlled to be displayed by being superimposed on a position of the clipping target area on the fisheye image captured by the horizontal photographing.

9. The image display method according to claim 8, wherein the image display device further comprises an imaging unit which performs image capturing by using the fisheye lens and an orientation detecting unit which detects an orientation of the image display device in the image capturing by the imaging unit, and wherein the vertical direction of the corrected image is specified based on orientation information detected by the orientation detecting unit.

10. The image display method according to claim 8, wherein display is controlled such that a specified vertical direction of the fisheye image and the specified vertical direction of the corrected image are aligned with each other, when the fisheye image and the corrected image are controlled to be simultaneously displayed.

11. The image display method according to claim 8, wherein display is controlled such that a specified vertical direction of the fisheye image and the specified vertical direction of the corrected image are aligned with each other, when the fisheye image and the corrected image are controlled to be displayed by switch display.

12. The image display method according to claim 8, wherein display is controlled such that the specified vertical direction of the corrected image is identifiable.

13. The image display method according to claim 12, wherein control of adding a mark indicating the vertical direction to the corrected image is performed.

14. A non-transitory computer-readable storage medium having stored thereon a program that is executable by a computer in an image display device including a display unit, the program being executable by the computer to actualize functions comprising:

clipping an image of one portion from a fisheye image captured by using a fisheye lens of an imaging unit as a clipping target area;

correcting distortion of the clipped image;

specifying a vertical direction of the corrected image, based on orientation information when the fisheye image is captured;

controlling the corrected image to be displayed on the display unit based on the specified vertical direction;

specifying, as a ground direction of the corrected image, a direction to be away from center of the fisheye image on a line connecting the center of the fisheye image and the clipping target area, when the orientation information indicates horizontal photographing performed with an optical axis direction of the fisheye lens being substantially opposite to a gravity direction; and when controlling the corrected image to be displayed by being superimposed on a position of the clipping target area on the fisheye image captured by the horizontal photographing, controlling a display orientation such that the ground direction of the corrected image specified by the specifying unit is oriented toward outside of the fisheye image.

* * * * *